July 12, 1927.
P. UPHAM
1,635,696
LEAF SPRING LUBRICATING DEVICE
Filed Feb. 1, 1923
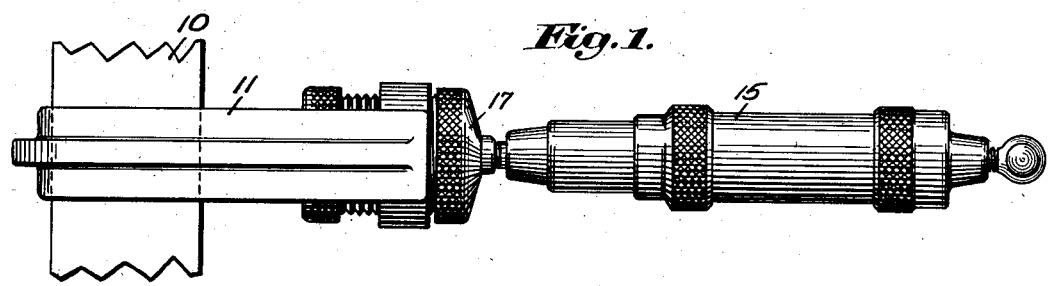
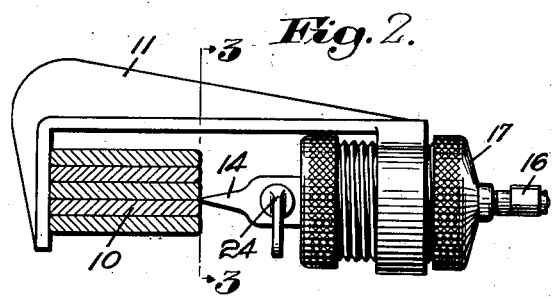
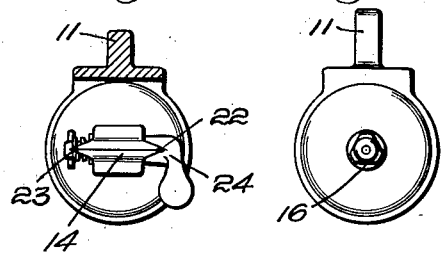
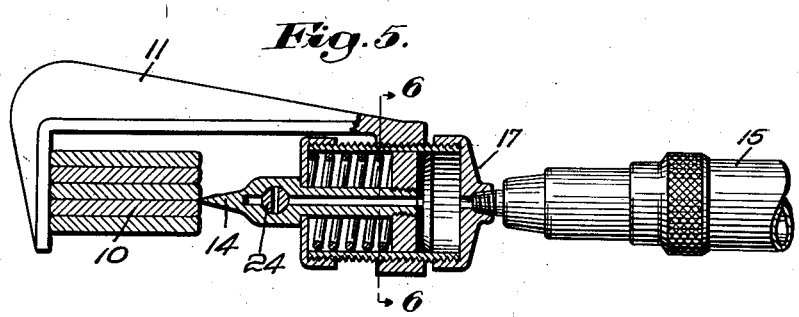
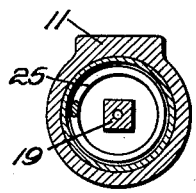
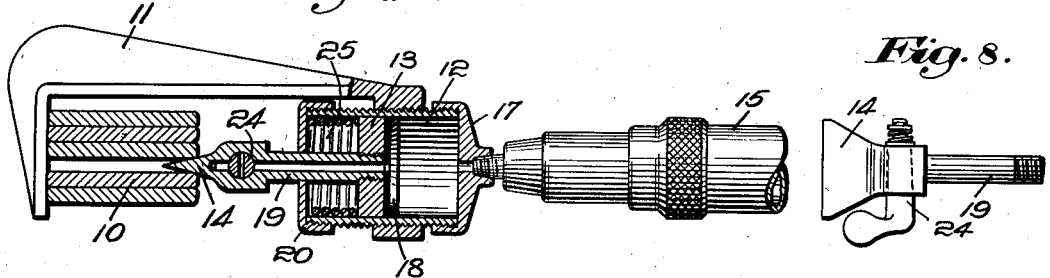
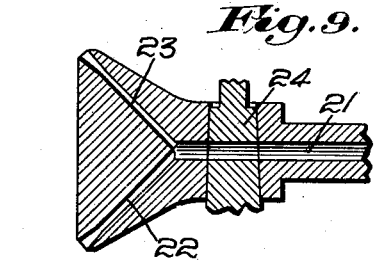
Inventor:
Preston Upham Patented July 12, 1927.

1,635,696

UNITED STATES PATENT OFFICE.

PRESTON UPHAM, OF BROOKLINE, MASSACHUSETTS, ASSIGNOR, BY MESNE ASSIGNMENTS, TO THE BASSICK MANUFACTURING COMPANY, OF CHICAGO, ILLINOIS, A CORPORATION OF DELAWARE.

LEAF-SPRING-LUBRICATING DEVICE.

Application filed February 1, 1923. Serial No. 616,277.

This invention pertains to improvements in leaf spring lubricating devices. It is among the objects of the invention to provide a leaf spring lubricating device of simple construction and very efficient in operation.

In the drawings, which show a preferred form of one embodiment of my invention:

Figure 1 is a plan view of a spring lubricating device and cooperating lubricant gun applied to a leaf spring;

Fig. 2 is a side elevation of the lubricating device and a cross-section of the spring to be lubricated;

Fig. 3 is a section on the line 3—3 of Fig. 2, being partly in elevation;

Fig. 4 is an end elevation of the device shown in Fig. 2;

Fig. 5 is a central longitudinal section through the spring lubricating device showing the device applied to a spring indicated in cross section;

Fig. 6 is a section on the line 6—6 of Fig. 5;

Fig. 7 is a view similar to Fig. 5, but showing the device with the spring leaves wedged apart and ready for lubricant;

Fig. 8 is a plan view of the wedge portion of the device; and

Fig. 9 is a horizontal section through the wedge device and cooperating valve.

Referring to the drawings and to the preferred form of my invention selected for illustrative purposes, I have shown a leaf spring 10, herein shown as composed of five leaves. To lubricate the spring, I have shown a yoke 11 adapted to engage the spring and cooperating with fluid pressure means herein typified as the cylinder 12 and piston 13 for actuating a wedge 14 to force the spring leaves apart. In the preferred form of my invention selected for illustrative purposes, the cylinder 12 has an adjustable engagement, herein shown as threads, whereby the device may be adapted for use with springs of varying width. Thus for a spring wider than the one illustrated, the cylinder 12 as viewed in Figs. 5 and 6 would be screwed to the right.

Pressure is admitted to the cylinder 12 from a lubricant gun 15, which is preferably of the type shown in the co-pending application of Howard J. Murphy Serial No. 543,-654, filed March 14, 1922, adapted detachably to engage a lubricant-receiving nipple 16 mounted on the rear head 17 of the cylinder 12. The piston 13 is preferably provided with a cup washer 18 and has a piston rod 19, herein shown as square in cross-section to preclude turning movement relative to the cylinder by reason of its passage through a square hole in the front head 20 of the cylinder. On the front end of this piston rod 19 is mounted the wedge 14. The piston rod 19 is apertured at 21, 22, 23 to admit passage of lubricant therethrough and a valve or cock 24 is provided which may cut off this passage. The piston 13 is actuated in one direction by the pressure of the lubricant behind it and may be actuated in the other direction by a spring 25 bearing against the front head of the cylinder.

I will now describe the operation of the preferred form of my invention illustrated. Referring to Fig. 5, the yoke 11 has been slipped over the spring 10 and the wedge 14 placed between the spring leaves which it is desired to separate. The valve 24 is closed. If now the handle of the lubricant gun 15 be turned to provide pressure through the nipple 16 into the cylinder 12 behind the cup leather 18, the piston 13 and connected wedge 14 will be pressed under great pressure between the spring leaves and will wedge them apart, as shown in Fig. 7. If now the valve 24 be turned, communication with the interior of the cylinder is effected and lubricant will be forced through the passages 21, 22, 23 between the spring leaves. Any desired amount of lubricant may be forced in by turning the handle of the lubricant gun to any desired extent to force out the lubricant. When the valve 24 is open, there will be little if any pressure behind the piston 13, and therefore the wedge may be easily worked back toward the cylinder 12 by rocking the device laterally, assisted more or less by the pressure of the spring leaves on the incline 14.

While I have shown and described a preferred form of my invention, it will be understood that major changes involving omission, alteration, substitution and reversal of parts may be made without departing from the scope of my invention, which is best defined in the following claims.

Claims.

1. A spring leaf lubricating device comprising, in combination, spring-engaging means, a wedge through which lubricant may be supplied to the leaves of a spring and lubricant-actuated means operable by trapping the lubricant, to be supplied to the spring, thereby to create a pressure sufficient to operate said lubricant actuated means and force said wedge between adjacent leaves of a spring before permitting passage of lubricant through said wedge to the spring.

2. A spring leaf lubricating device comprising, in combination, spring-engaging means, a wedge having lubricant-conducting passages through which lubricant may flow to the leaves of a spring from a supply under pressure, lubricant-actuated means and means for closing the passages through said wedge thereby to trap the lubricant to be supplied to the spring unitl sufficient pressure is created to operate said lubricant-actuated means so as to force said wedge between adjacent leaves of a spring before permitting passage of lubricant through the passages in said wedge.

3. A leaf spring lubricating device comprising, in combination, spring-engaging means, a wedge, piston and cylinder means operatively connected with said wedge, and a source of lubricant under pressure for actuating relative movement between said cylinder and piston to force said wedge between adjacent leaves of said spring.

4. A leaf spring lubricating device comprising, in combination, spring-engaging means, a wedge, piston and cylinder means operatively connected with said wedge, and a quick detachable source of lubricant under pressure for actuating relative movement between said cylinder and piston to force said wedge between adjacent leaves of said spring.

5. A spring leaf lubricating device comprising, in combination, a yoke having spring-engaging means, a cylinder carried by said yoke, a piston reciprocable in said cylinder, a wedge operatively connected to said piston and adapted to be forced between adjacent leaves of the spring by the pressure of lubricant and a means for admitting lubricant under pressure between said piston and cylinder.

6. A spring leaf lubricating device comprising, in combination, a yoke having spring-engaging means, a cylinder carried by said yoke, a piston reciprocable in said cylinder, a wedge operatively connected to said piston and adapted to be forced between adjacent leaves of the spring, a means for admitting lubricant under pressure between said piston and cylinder, and resilient means for forcing said piston in a direction opposite to that in which it is moved by said lubricant.

7. A spring leaf lubricatig device comprising, in combination, a yoke, a cylinder carried by said yoke, a piston reciprocable in said cylinder, a wedge operatively connected to said piston and adapted to be forced between adjacent leaves of the spring, a means for admitting lubricant under pressure between said piston and cylinder, and a valve operatively interposed in a passage communicating with said wedge.

8. A leaf spring lubricating device comprising, in combination, leaf separating means, lubricant-actuated means for forcing said leaf separating means between the leaves, and a valve closable during the entrance of said leaf separating means between the leaves and subsequently openable to admit lubricant between said leaves.

9. In a spring leaf lubricating device, a source of lubricant under pressure, wedging means actuated by the pressure of the lubricant to introduce a nozzle between leaves of a spring, valve means for permitting the flow of lubricant to said nozzle thereby controlling the pressure actuating said wedging means.

In testimony whereof, I have signed my name to this specification.

PRESTON UPHAM.